March 6, 1951     J. B. NICHOLSON     2,544,347
GASKET FOR INSERTION BETWEEN JOINT FACES
WHICH ARE SUBJECT TO PRESSURE
Filed April 26, 1948
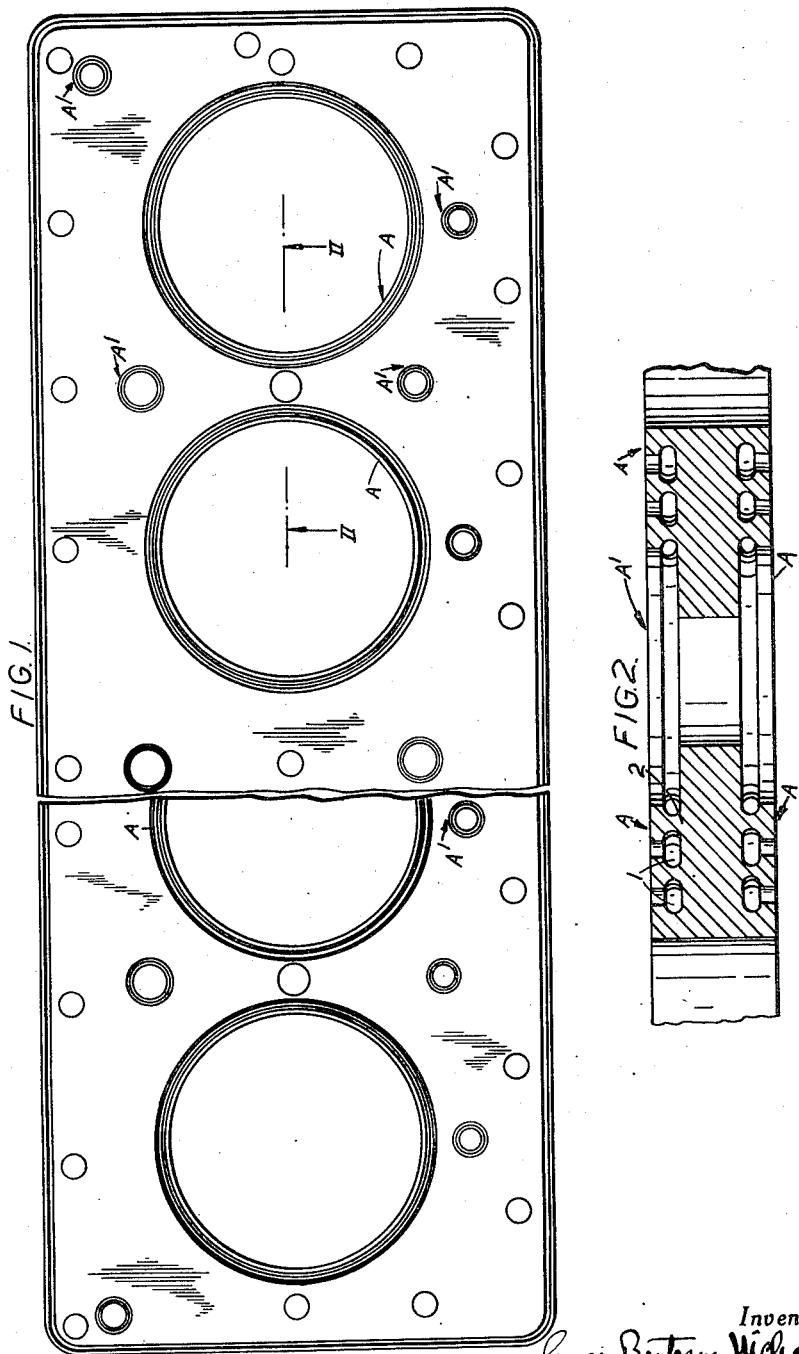
Inventor
James Bertram Nicholson
By
Alexander McDowell
Attorneys

Patented Mar. 6, 1951

2,544,347

UNITED STATES PATENT OFFICE

2,544,347

GASKET FOR INSERTION BETWEEN JOINT FACES WHICH ARE SUBJECT TO PRESSURE

James Bertram Nicholson, Craigmillar, Slocksfield, England, assignor to The Corrugated Packing and Sheet Metal Company Limited, Gateshead, England Application April 26, 1948, Serial No. 23,176
In Great Britain March 20, 1947

2 Claims. (Cl. 288—21)

This invention relates to gaskets for insertion between joint faces which are subjected to pressure.

Hitherto the joints between cylinder heads and their cylinders or between the latter and the engine crank case for example, have been formed of a composite sheet of copper and asbestos comprising a relatively thick inner layer of asbestos and outer layers of relatively thin copper reinforcements so that when the joint was tightened up the maximum pressure would be exerted at such reinforced corrugated portion. The drawback to this form of gasket was that owing to the relatively soft core of asbestos the latter on tightening of the joint, tended to flow away from the pressure zones and so cause distortion and weakening of the joint with the result that the joint blew and allowed the escape of the pressure fluid. To overcome this drawback it was proposed to form the gasket of a single thickness of metal with thicker marginal portions around the openings, such thicker marginal portions having formed therein V-ridges whose apexes projected beyond the surfaces of the rest of the metal, but the said ridges were irregular and uneven in height even with the most careful workmanship, while owing to the shape of their cross section they offered a high resistance to the compressing action due to tightening of a joint. Furthermore the sharp apexes injured the joint faces.

The object of the invention is to provide a gasket in which the above drawbacks are absent and which on the other hand will make a perfect fluid-tight joint on tightening up. Another object is to provide a gasket which can be substituted for a copper-asbestos gasket in an existing internal combustion engine without effecting the compression ratio of the said engine.

The gasket according to the invention is made of metal sheet having about the various openings thickened marginal portions in which are formed undercut grooves of substantially T-slot cross section which leave overhanging ridges on each side of a central web, the outer faces of which ridges make a resilient surface contact with, and without scoring the faces of the members forming the joint, so that the resulting joint is fluid tight without there being any possibility of its blowing.

The invention will now be described by way of example with reference to the accompanying drawings which show a preferred form of gasket.

In the said drawings:

Fig. 1 is a plan view of a four-cylinder engine gasket.

Fig. 2 is an enlarged fragmentary section on the line II—II of Fig. 1.

Referring more particularly to the drawings, A, $A^1$ indicate the marginal portions of the gasket.

These each have formed thereon a series of undercut grooves as at 1, of substantial T-slot cross section which leave overhanging ridges on each side of a central web to give a substantial T-section with the sides of the upright or web of the T segmental and the surface of the cross piece, formed by the ridges, flat. An example of typical dimensions is: thickness of marginal portions .062", $\frac{1}{12}$" distance between, the centre lines of the grooves, groove width in the upright portion of the T-slot .015", and the thickness of the web at its thinnest portion or neck $\frac{1}{24}$". It is the narrow necks 2 in the T-ridges which impart the requisite resilience so that when the members forming the joint are bolted together the marginal portions give resiliently to any slight irregularities. The gasket is therefore subjected to even pressure throughout its marginal portions; and as it is homogeneous throughout there is no possibility of any blowing past it.

By making the thickened marginal portions of the same thickness as that of the usual copper asbestos gasket, a gasket according to the invention may be substituted for a copper asbestos or similar material gasket in an existing engine without effecting the distance between the members forming the joint, so that the dimensions of the compression space are not effected, and the compression ratio is thus not effected.

The gasket may be made of ferrous or non-ferrous metal, and may be applied to engines, pumps and pneumatic and hydraulic machines, in fact all joints subjected to fluid pressure.

I claim:

1. A gasket for insertion between joint faces, which is made of metal sheet having about the various openings thickened marginal portions in which are formed undercut grooves of substantial T-slot cross section which leave overhanging ridges on each side of a central web the outer faces of which ridges make a resilient surface contact with, and without scoring, the faces of the members forming the joint, so that the resulting joint is fluid tight without there being any possibility of its blowing.

2. A gasket according to claim 1 having the following dimensions: thickness of marginal portion .062", $\frac{1}{12}$" distance between the centre lines of the grooves, groove width in the upright portion of the T-slot .015", and the thickness of the web at its thinnest portion or neck $\frac{1}{24}$".

JAMES BERTRAM NICHOLSON.

REFERENCES CITED

The following references are of record in the file of this patent:

FOREIGN PATENTS

| Number | Country | Date |
|---|---|---|
| 563,738 | Germany | of 1932 |
| 622,533 | Great Britain | May 3, 1949 |